United States Patent [19]
Mamiya et al.

[11] Patent Number: 5,684,987
[45] Date of Patent: Nov. 4, 1997

[54] MANAGEMENT SYSTEM OF MULTIMEDIA

[75] Inventors: Akira Mamiya, Yokohama; Akira Suga, Tokyo; Hideaki Kawamura, Kawasaki; Takashi Aizawa, Yokohama; Fumiaki Takahashi, Machida; Kenji Hatori, Hatogaya, all of Japan

[73] Assignee: Canon Kabushiki Kaisha, Tokyo, Japan

[21] Appl. No.: 361,520

[22] Filed: Dec. 22, 1994

[30] Foreign Application Priority Data

Dec. 24, 1993 [JP] Japan ................. 5-327955

[51] Int. Cl.⁶ ............................. G06F 17/30; G06F 9/00
[52] U.S. Cl. .................. 395/614; 364/130; 395/609; 395/673
[58] Field of Search ...................... 395/600, 575, 395/700, 275

[56] References Cited

U.S. PATENT DOCUMENTS

| | | | |
|---|---|---|---|
| 4,791,564 | 12/1988 | Takai | 364/200 |
| 5,163,147 | 11/1992 | Orita | 395/600 |
| 5,469,576 | 11/1995 | Dauerer et al. | 395/186 |
| 5,488,411 | 1/1996 | Lewis | 384/8 |

Primary Examiner—Thomas G. Black
Assistant Examiner—Cheryl Lewis
Attorney, Agent, or Firm—Fitzpatrick, Cella, Harper & Scinto

[57] ABSTRACT

A management system of a multimedia comprises a multimedia apparatus and a multimedia controller for managing and controlling the multimedia apparatus. The management system has processing means for transmitting and receiving a message between the multimedia controller and the multimedia apparatus, for automatically setting a predetermined name with respect to an owner of the multimedia apparatus, and for automatically or manually setting predetermined attributes with respect to attributes. The presence or absence of the right to access to the multimedia apparatus is judged in accordance with the contents of the attributes. By setting the multimedia apparatus itself to an object, a multimedia apparatus object is constructed in the multimedia apparatus. A circuit to manage a self secret protection is provided in the multimedia apparatus object. By setting a file in the multimedia apparatus to an object, attributes and an owner of the file are concealed in the file object, thereby protecting the secret of the file object.

27 Claims, 6 Drawing Sheets

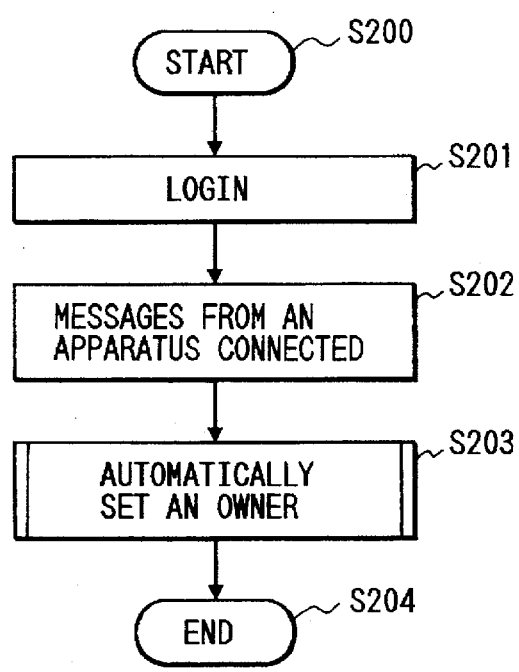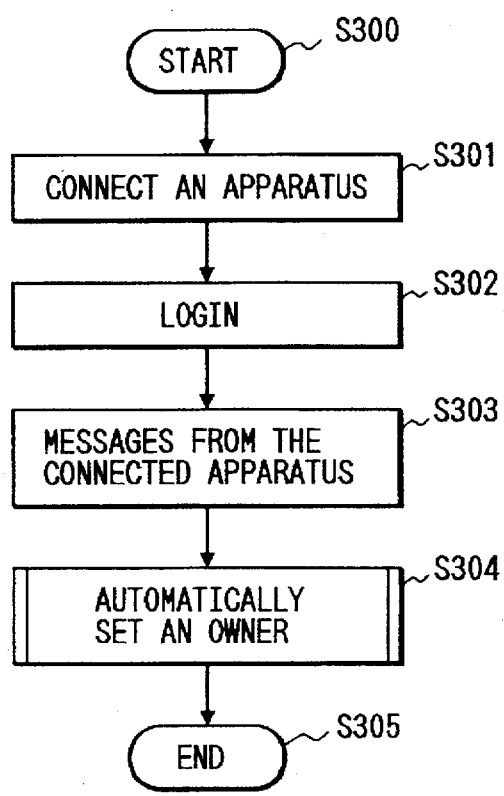

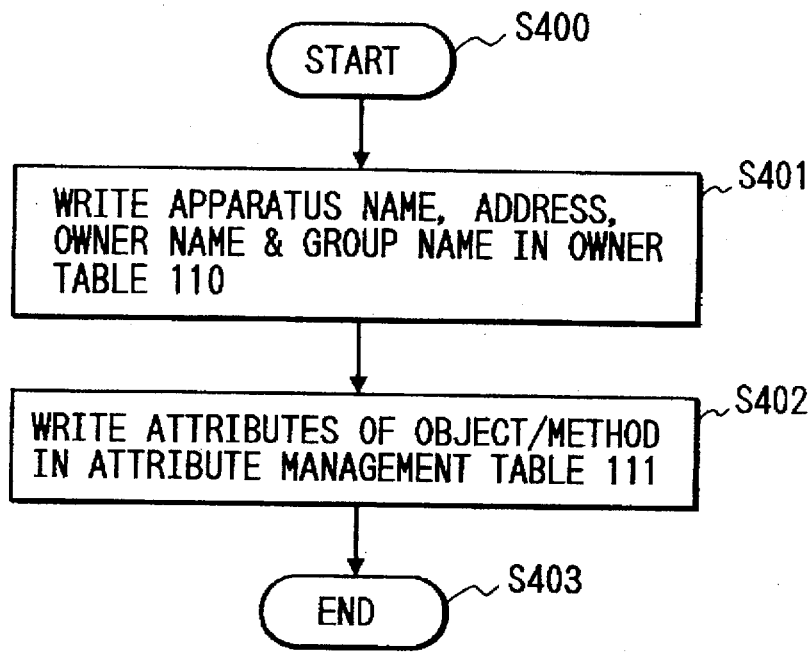
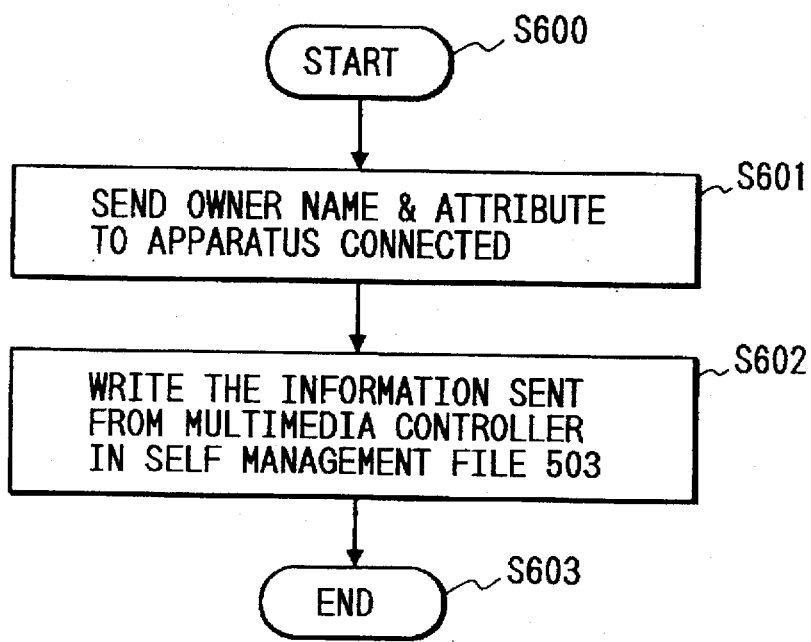

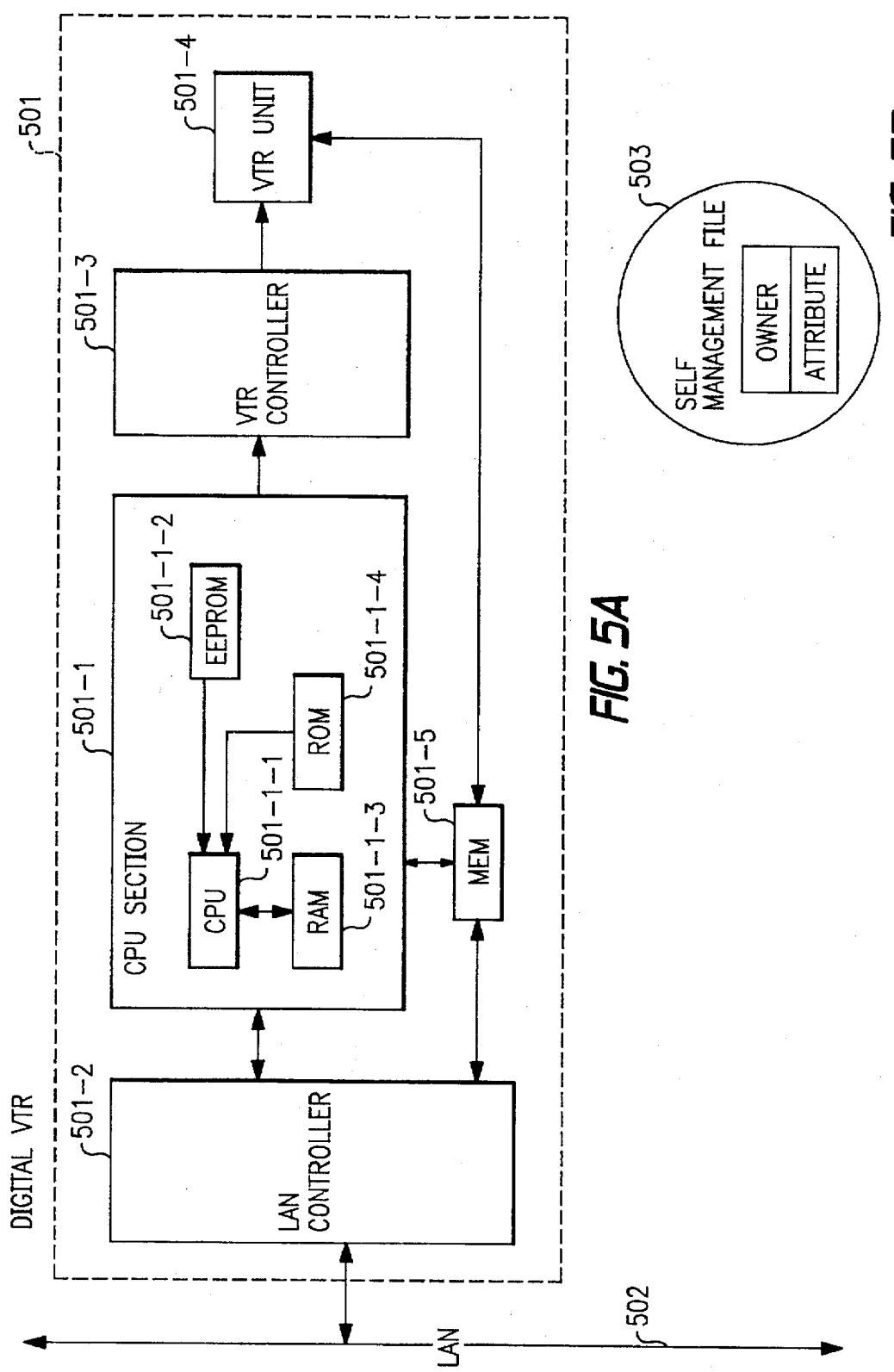

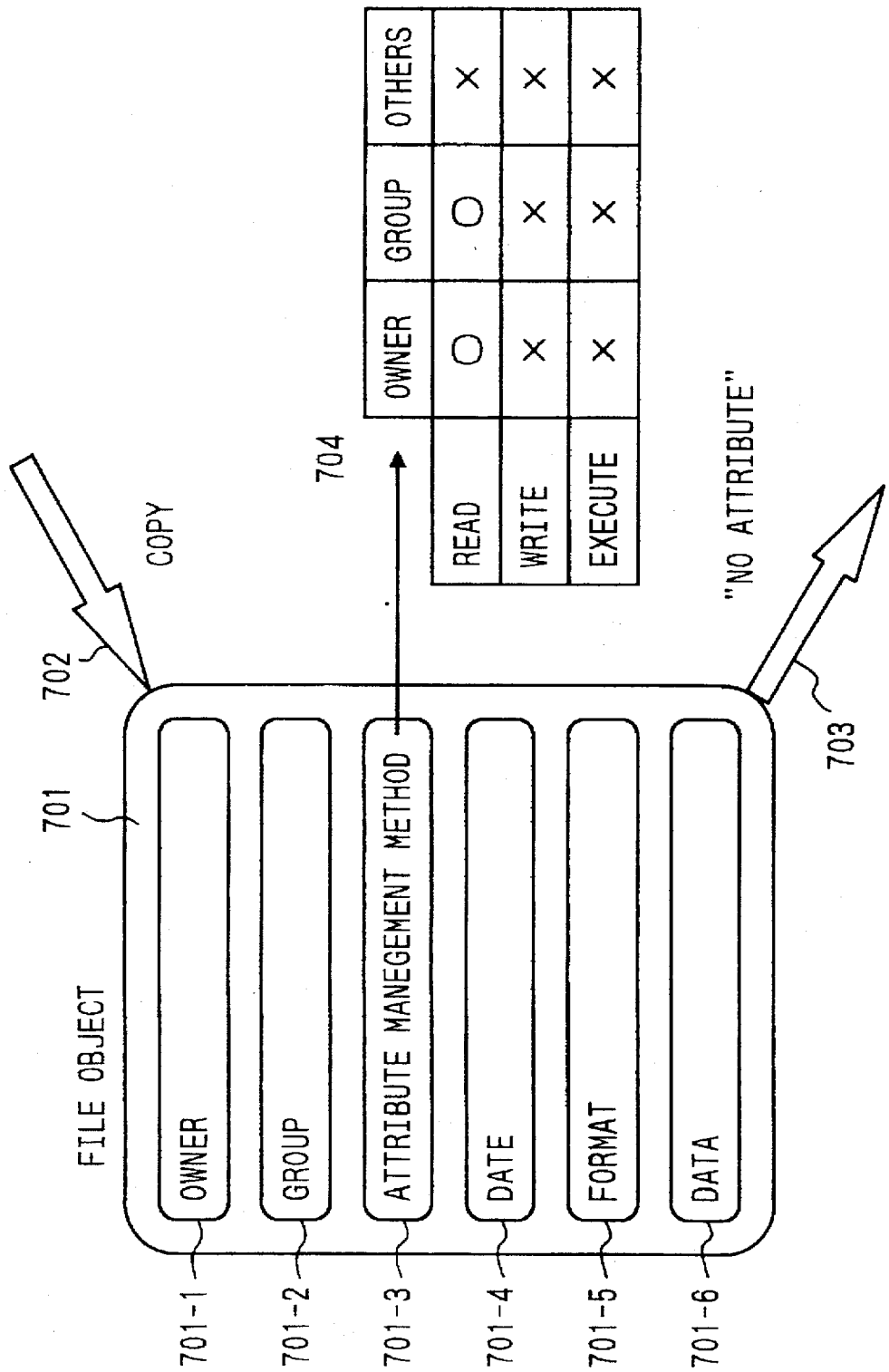

MANAGEMENT SYSTEM OF MULTIMEDIA

BACKGROUND OF THE INVENTION

1. Field of the Invention

The present invention relates to a management system to realize security of a network system comprising a multimedia apparatus and a multimedia controller for managing and controlling the multimedia apparatus.

2. Related Background Art

Hitherto, a personal computer is connected to a network system or peripheral equipment by using SCSI, GPIB, LAN, or the like.

In the case where the peripheral equipment is connected to the personal computer and the peripheral equipment is used, all of the users who can access to the personal computer can operate the peripheral equipment. The users can also use the peripheral equipment via the network.

In the case where a printer or the like is used as peripheral equipment, there is no problem. However, in the case where digitalized audio/visual (hereinafter, abbreviated to AV) equipment is used as peripheral equipment of the personal computer or workstation, its security becomes a problem.

As a file management, for example, in case of the UNIX which is a multiuser system, since files are managed by an OS, the files of the other users can be changed or can be opened and watched, so that there is a problem of security.

In the conventional technique as mentioned above, even in peripheral equipment such as AV equipment which is privately used, anyone who can access to a host computer for controlling the peripheral equipment can operate the AV equipment, so that there is a drawback such that a file which is not desired to be read or changed is changed.

Particularly, in the case where the computer system is operated by connecting to the network, there is an inconvenience such that a file is accessed from another computer system via the network and a change in contents of the file or a control of the peripheral equipment is performed.

In the conventional network system as mentioned above, the security regarding the peripheral equipment or file becomes a problem.

SUMMARY OF THE INVENTION

It is an object of the invention to provide a management system which can prevent a leakage of secrets in a multimedia apparatus in consideration of the above problems.

To accomplish the above object, according to the invention, there is provided a management system of a multimedia apparatus, comprising: a multimedia apparatus; and a multimedia controller for managing and controlling the multimedia apparatus, wherein the system has processing means for transmitting and receiving a message between the multimedia controller and the multimedia apparatus, for automatically setting a predetermined name with respect to the owner of the multimedia apparatus, and for automatically or manually setting predetermined attributes and judges the presence or absence of a right to access to the multimedia apparatus in accordance with the contents of the attribute.

It is preferable to construct a multimedia apparatus object in the multimedia apparatus by setting the multimedia apparatus itself to an object and to provide means for managing a self secret protection in the multimedia apparatus object. By setting a file in the multimedia apparatus to an object, further, the attributes of the file and the owner information are concealed in the file object of such a file, so that the secret of the file object can be also protected.

According to the above construction of the invention, the message can be transmitted and received between the multimedia apparatus and the multimedia controller, so that the multimedia controller can examine the attributes by transmitting the message to the multimedia apparatus. By executing the management according to the information written in the object, consequently, the change in attributes of the apparatus and the inhibition of the operation to the user having no attribute can be easily performed. The secret can be protected.

That is, a CPU section to understand the message is installed in each of the multimedia apparatus and the multimedia controller and both of them are set to objects, thereby realizing a security mechanism.

On the other hand, the file is also set to an object and the attributes and the owner information are written into the file object, thereby realizing the security mechanism.

Specifically speaking, by concealing the attributes of the multimedia apparatus in a representative object of the multimedia apparatus which is realized in the multimedia controller or into a management table of the multimedia apparatus itself, the attributes are checked by messaging and whether the access is executed or not can be decided on the basis of the attributes, so that the user having no attribute cannot control the apparatus. The invention is useful to protect the secret.

BRIEF DESCRIPTION OF THE DRAWINGS

FIG. 2 is a flowchart showing a processing procedure when connecting an apparatus in each embodiment of the invention;

FIG. 3 is a flowchart showing a processing procedure when connecting the apparatus in each embodiment of the invention;

FIG. 4 is a flowchart showing an owner setting process in the first embodiment;

FIGS. 5A and 5B show a circuit constructional diagram of a digital VTR showing the second embodiment;

FIG. 6 is a flowchart showing a procedure of an automatic owner setting process in the case where a table for managing attributes is possessed on an apparatus side as a second embodiment;

FIG. 7 is a diagram of a file object showing the third embodiment; and

DETAILED DESCRIPTION OF THE PREFERRED EMBODIMENTS

Embodiments of the invention will now be described in detail hereinbelow with reference to the drawings.

Embodiment 1

Figure 1:
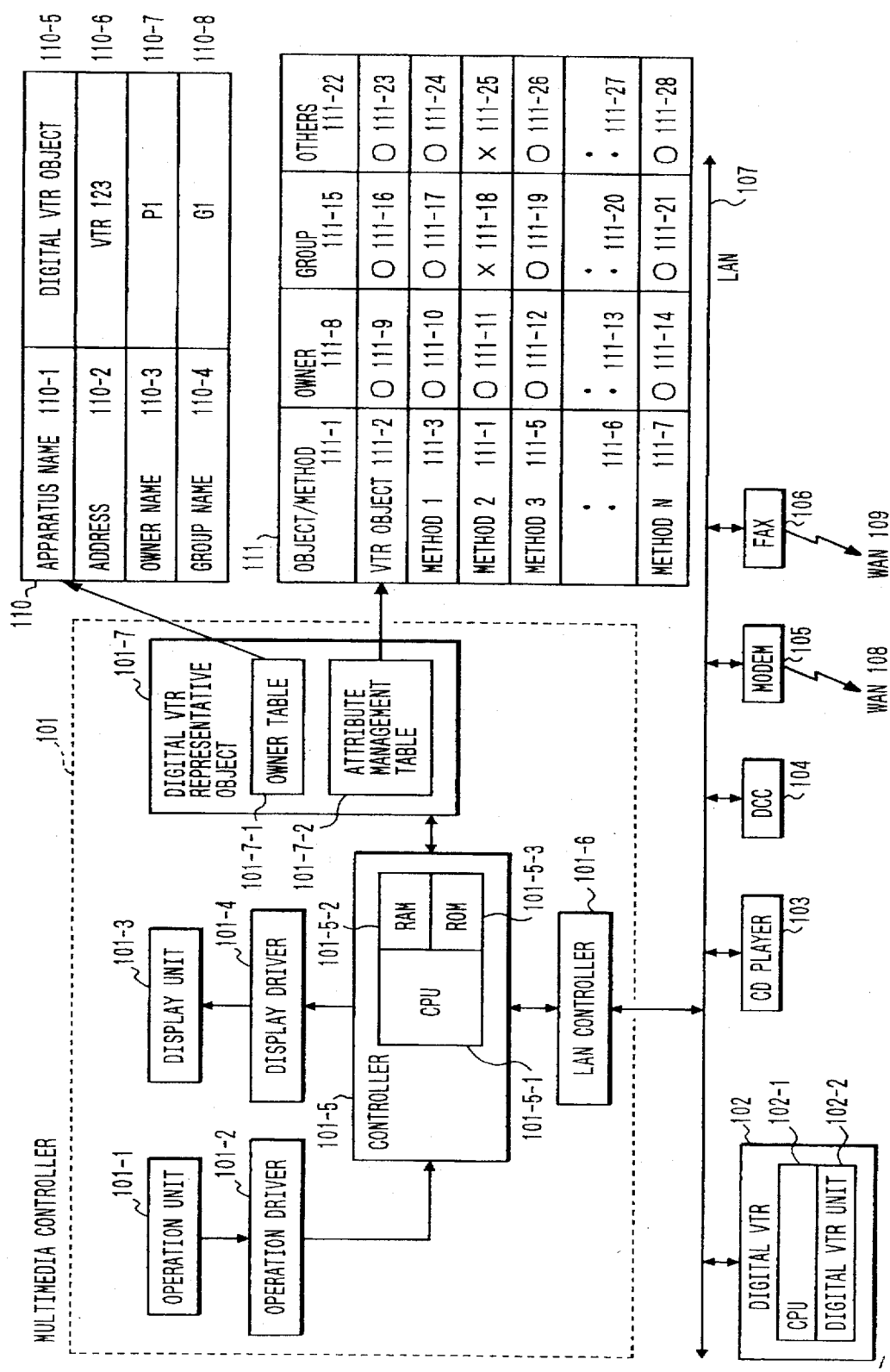
FIG. 1 is a system constructional diagram showing an embodiment of the invention.

FIG. 1 shows a managing system of a multimedia apparatus to which the invention is applied. The system shown in the diagram comprises: a multimedia controller 101; a local area network (LAN) 107 including multimedia apparatuses such as digital VTR 102, CD player 103, DCC (digital compact cassette) 104, modem 105, FAX (facsimile apparatus) 106, and the like; and a wide area network (WAN). The LAN is not limited to only a bus shape as shown in FIG. 1 but may has also a star shape, a ring shape, or a daisy chain shape.

The multimedia controller 101 comprises: an operation unit 101-1; an operation driver 101-2; a display unit 101-3; a display driver 101-4; a controller 101-5; an LAN controller 101-6; and a multimedia apparatus representative object (in this instance, a digital VTR representative object 101-7).

The controller 101-5 includes: a CPU 101-5-1; an RAM 101-5-2; and an ROM 101-5-3. When the CD player 103, DCC 104, modem 105, FAX 106, and the like are connected, a CD player representative object, a DCC representative object, a modem representative object, and a FAX representative object also exist in a manner similar to the digital VTR representative object, respectively. Descriptions about them, however, are omitted here.

As modem and FAX, further, it is also possible to remotely access from another system the multimedia controller 101 through WANs 108 and 109 by using a public line or the like.

An explanation will now be made with respect to the case of using a digital VTR as a multimedia apparatus. It is assumed, therefore, that, a digital VTR representative object is realized in the multimedia controller 101.

The digital VTR representative object 101-7 includes an owner table 101-7-1 and an attribute management table 101-7-2.

When the digital VTR 102 is connected and an arbitrary user is in a log-in state, a part of the digital VTR object stored in a CPU 102-1 of the digital VTR is read into the multimedia controller and the digital VTR representative object for performing a display of the digital VTR or the like is formed in the multimedia controller. An owner table 110 to store an apparatus name, an address, an owner name, and a group name and an attribute management table 111 to check whether the object/method can be accessed or not are also formed in the digital VTR representative object.

The owner table 110 comprises an apparatus name 110-1, an address 110-2, an owner name 110-3, and a group name 110-4. The contents of them are, for example, digital VTR object, vtr123, pl, and gl as shown in 110-5 to 110-8.

The attribute management table 111 has a matrix structure comprising rows 111-2 to 111-7 of objects or methods and columns of an owner 111-8, a group 111-15, and others 111-22. Whether it is possible to access to the intersecting portion or not is written. In this instance, "o" is written in the case where it is possible to access (specifically speaking, it is controlled by a flag) and "x" is written in the case where it is impossible to access (specifically speaking, it is controlled by a flag). For example, the owner of method 1 is set to 111-10 and "o" and the group of method 2 is set to 111-18 and "x". For instance, in the case where the method 2 indicates a dubbing, therefore, although the owner can perform the dubbing, the other users cannot execute the dubbing.

FIGS. 2 and 3 show flowcharts in the case where a new multimedia apparatus is connected.

FIG. 2 shows a processing procedure in the case where the apparatus is connected when a certain user is in the log-in state. The processing routine first starts from step S200. The apparatus is connected in the log-in state (S201). A message from the connected apparatus is transmitted to the multimedia controller (S202). The owner is automatically set on the multimedia controller side (S203) and the processing routine is finished (S204).

FIG. 3 shows a procedure in which, after the apparatus was connected, a certain user enters a log-in state, thereby automatically setting the owner. When the processing routine starts (in step S300), the apparatus is connected (S301). A certain user enters a log-in state (S302). A message is generated from the apparatus at that time (S303). The owner is automatically set on the multimedia controller side (S304). The processing routine is finished (S305).

FIG. 4 shows the automatic owner setting process shown in FIGS. 2 and 3. First, the processing routine is started (S400). The apparatus name, address, owner name, and group name are written into the owner table indicated at 110 (refer to FIG. 1) (S401). The attributes of the object/method are subsequently written into the attribute management table indicated at 111 (refer to FIG. 1) (S402). The processing routine is finished (S403).

The attribute management table is a default for the object and method and only the owner is permitted to obtain the right to access. The owner in such a case is the user who was in the log-in state before the connection of the apparatus and continues the log-in state after the connection or the user who first enters the log-in state after the apparatus was connected. The user can also manually change the attributes in accordance with the application and write into the attribute management table.

Embodiment 2

The second embodiment of the invention is shown in FIGS. 5A and 5B. According to the second embodiment, the table for managing the owner and attributes is realized as it is in the object instead of the representative object. Explanation will be also made here by using the digital VTR.

A digital VTR 501 comprises: a CPU section 501-1; an LAN controller 501-2; a VTR controller 501-3; a VTR unit 501-4; and a memory 501-5.

The CPU section 501-1 comprises: a CPU 501-1-1; an EEPROM 501-1-2; a RAM 501-1-3 and a ROM 501-1-4. A self management file 503 in FIG. 5B is formed in the EEPROM 501-1-2, thereby managing the owner and the attributes. Although it is not always necessary to realize the self management file in the EEPROM, it is desirable to use a memory device in which information is not erased even if a power source is turned off.

The CPU 501-1-1 performs the whole control. The memory 501-5 functions as a buffer in case of reading or writing from/to the VTR.

FIG. 6 shows a flowchart for automatically setting the owner when the attributes are written into the object. The processing routine first starts (S600). The owner name and the apparatus attribute are transmitted to the connected apparatus (S601). The information (owner name, apparatus attribute) sent from the multimedia controller side is written into the self management file on the apparatus side (S602). The processing routine is finished (S603). The self management file also has a format in a manner similar to that of the owner table and attribute management table in the first embodiment.

Embodiment 3

The third embodiment of the invention is shown in FIG. 7. The third embodiment shows an example in which a file itself is also set to an object and the owner, group attributes, and the like are written into the file. Reference numeral 701 in FIG. 7 denotes a file object comprising: an owner 701-1; a group 701-2; an attribute management method 701-3; a date 701-4; a format 701-5; and data 701-6.

For instance, when the user who is not the owner of the file and doesn't belong to any group copies the file, a copy message 702 is first transmitted from the multimedia controller to the file object 701. The file object refers to a table 704 which is managed by the attribute management method. Since the attributes don't have any other right to read, a message 703 of "NO ATTRIBUTE" is sent to the multimedia controller. The above processes are shown as a flowchart in FIG. 8.

Figure 8:
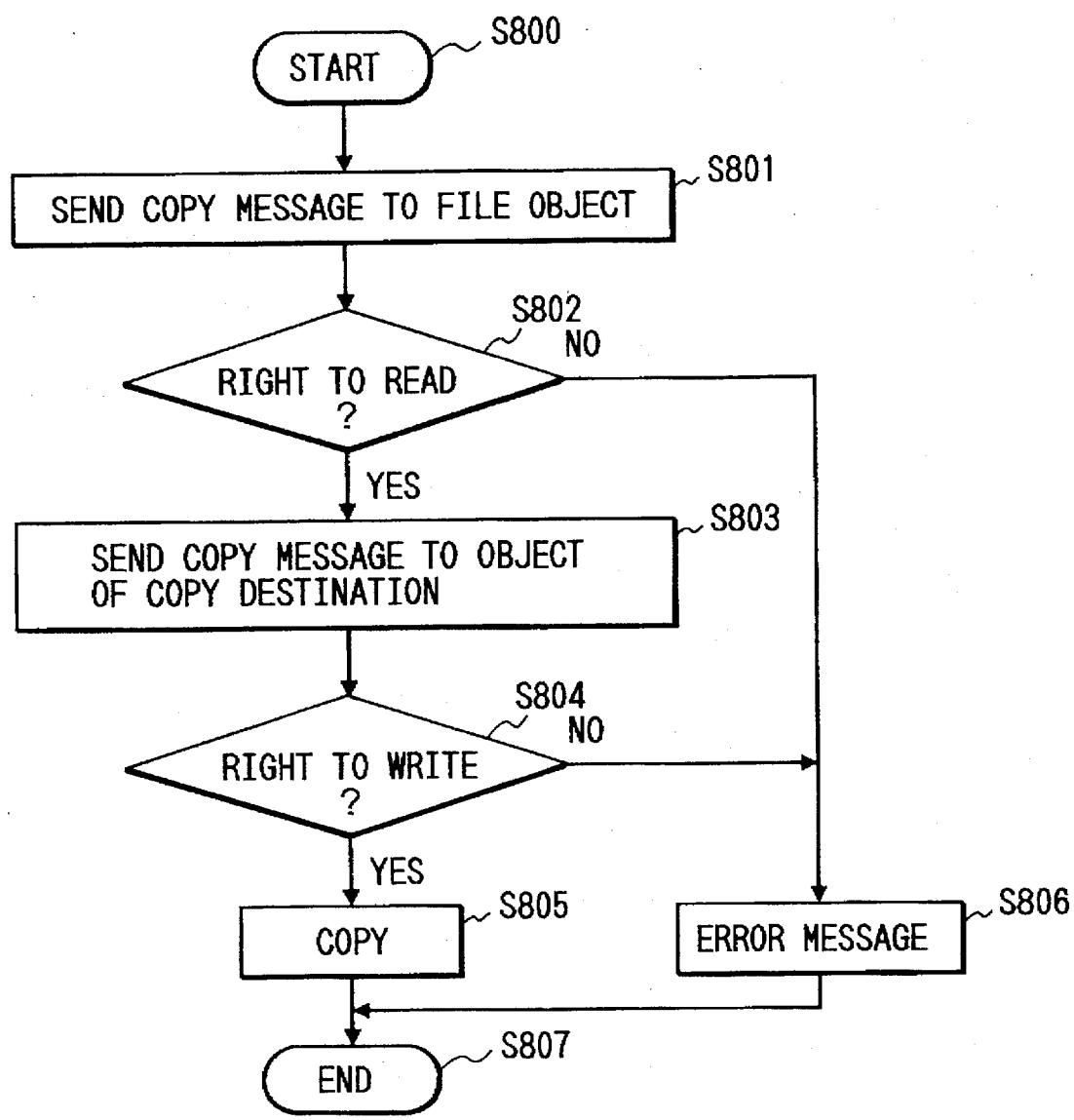
FIG. 8 is a flowchart showing a processing procedure in case of performing a copy operation in the third embodiment.

In FIG. 8, first, the processing routine is started (S800). The copy message is transmitted to the file object (S801). The table to manage the attributes is subsequently referred.

In the case where there is a right to read, the processing routine is branched to YES in step S802 and the copy message is transmitted to the object on the copy destination side (S803). A check is made to see if there is a right to write in the object or not (S804). In the case where there is the right, a copying process is executed (S805). The processing routine is finished (S807). On the other hand, if NO in S802 or S804, an error message is sent to the multimedia controller (S806). The multimedia controller receives the message and informs it to the user by displaying the message on the screen. The processing routine is finished (S807).

According to the invention, as described above, the management system in which the message is transmitted and received between the multimedia apparatus and the multimedia controller, thereby preventing a leakage of secrets in the multimedia apparatus can be realized.

With respect to the file, the file is also set to an object and the attributes are concealed in the object, so that the security can be improved.

It will be obviously understood that each user has the information such as user ID, password, or the like and he enters the log-in state by using the information and the group and the others are discriminated by the information.

What is claimed is:

1. An information management system comprising:
    external memory means for storing various information including access information indicative of permission or inhibition of access to said external memory means;
    input means for inputting an instruction for performing an access to said external memory means;
    information memory means for storing the access information transferred from said external memory means; and
    control means for controlling the access in response to the instruction input by said input means on the basis of the access information stored in said information memory means.

2. A system according to claim 1, wherein the access information includes an owner, a group, and other items.

3. A system according to claim 2, wherein the access information is classified depending on a kind of access.

4. A system according to claim 2, wherein the owner, group, and others items are discriminated by a user ID.

5. A system according to claim 1, wherein said external memory means comprises a video tape recorder.

6. A system according to claim 1, wherein said external memory means comprises a digital compact cassette.

7. An information management method comprising the steps of:
    storing access information indicative of permission or inhibition of access to external memory means, the access information being transferred from the external memory means;
    inputting an instruction for performing an access to the external memory means; and
    controlling the access in response to the input instruction on the basis of the stored access information.

8. An information processing apparatus comprising:
    memory means for storing access information indicative of permission or inhibition of access to external memory means, the access information being transferred from the external memory means;
    receiving means for receiving an instruction for performing an access to the external memory means; and
    control means for controlling the access in response to the instruction received by said receiving means on the basis of the access information stored in said memory means.

9. An apparatus according to claim 8, wherein the access information includes an owner, a group, and other items.

10. An apparatus according to claim 9, wherein the access information is classified depending on a kind of access.

11. An apparatus according to claim 9, wherein the owner, the group, and the other items are discriminated by a user ID.

12. An apparatus according to claim 8, wherein the external memory means comprises a video tape recorder.

13. An apparatus according to claim 8, wherein the external memory means comprises a digital compact cassette.

14. An information processing method comprising the steps of:
    storing access information indicative of permission or inhibition of access to external memory means, the access information being transferred from the external memory means;
    receiving an instruction for performing an access to the external memory means; and
    controlling the access in response to the received instruction on the basis of the stored access information.

15. A method according to claim 14, wherein the access information includes an owner, a group, and other times.

16. A method according to claim 15, wherein the access information is classified depending on a kind of access.

17. A method according to claim 15, wherein the owner, the group, and the other items are discriminated by a user ID.

18. A method according to claim 14, wherein the external memory means comprises a video tape recorder.

19. A method according to claim 14, wherein the external memory means comprises a digital compact cassette.

20. An information processing apparatus comprising:
    memory means for storing access information indicative of permission or inhibition of access to a file, the access information being transferred from the file;
    receiving means for receiving an instruction for performing an access to the file; and
    control means for controlling the access in response to the instruction received by said receiving means on the basis of the access information stored in said memory means.

21. An apparatus according to claim 20, wherein the access information includes an owner, a group, and other items.

22. An apparatus according to claim 21, wherein the access information is classified depending on a kind of access.

23. An apparatus according to claim 21, wherein the owner, the group, and the other items are discriminated by a user ID.

24. An information processing method comprising the steps of:
    storing access information indicative of permission or inhibition of access to a file, the access information being transferred from the file;
    receiving an instruction for performing an access of the file; and
    controlling the access in response to the received instruction on the basis of the stored access information.

25. A method according to claim 24, wherein the access information includes an owner, a group, and other items.

26. A method according to claim 25, wherein the access information is classified depending on a kind of access.

27. A method according to claim 25, wherein the owner, the group, and the other items are discriminated by a user ID.

* * * * *